US009081389B2

(12) United States Patent
Foster

(10) Patent No.: US 9,081,389 B2
(45) Date of Patent: Jul. 14, 2015

(54) FLOW CONTROL DEVICE AND FLOW CONTROL METHOD

(75) Inventor: Geoffrey Frederick Foster, Glenorie (AU)

(73) Assignee: Premier-Fosters (Australia) Pty Limited, North Rocks, New South Wales (AU)

( * ) Notice: Subject to any disclaimer, the term of this patent is extended or adjusted under 35 U.S.C. 154(b) by 547 days.

(21) Appl. No.: 12/936,191

(22) PCT Filed: Apr. 1, 2009

(86) PCT No.: PCT/AU2009/000402
§ 371 (c)(1),
(2), (4) Date: Dec. 8, 2010

(87) PCT Pub. No.: WO2009/121138
PCT Pub. Date: Oct. 8, 2009

(65) Prior Publication Data
US 2011/0146805 A1  Jun. 23, 2011

(30) Foreign Application Priority Data

Apr. 1, 2008 (AU) ............................... 2008901562
Sep. 23, 2008 (AU) ............................... 2008904936

(51) Int. Cl.
*E03B 7/04* (2006.01)
*F16K 51/00* (2006.01)
*G05D 7/06* (2006.01)
*A01G 25/16* (2006.01)
*E03B 7/07* (2006.01)

(52) U.S. Cl.
CPC ............ *G05D 7/0652* (2013.01); *A01G 25/165* (2013.01); *E03B 7/071* (2013.01)

(58) Field of Classification Search
CPC ..... G05D 22/02; G05D 7/0652; A01G 25/16; A01G 25/165; E03B 7/071
USPC ............... 137/624.11, 624.12, 624.18, 625.4, 137/599.01, 595.05, 595.07, 595.09; 239/69, 70
See application file for complete search history.

(56) References Cited

U.S. PATENT DOCUMENTS 3,878,376 A * 4/1975 Sholes et al. ............. 137/624.11
4,209,131 A * 6/1980 Barash et al. .................... 239/69
(Continued)

FOREIGN PATENT DOCUMENTS

CN    201010930 Y    1/2008
DE    3245284 A1     6/1983
(Continued)

OTHER PUBLICATIONS

International Search Report and Written Opinion mailed Jun. 9, 2009, from PCT Application No. PCT/AU2009/000402 (13 pages).
(Continued)

*Primary Examiner* — Kevin Lee
(74) *Attorney, Agent, or Firm* — Kilpatrick Townsend & Stockton LLP

(57) ABSTRACT

A water flow control device (27) that may, for example, deliver water to a domestic dwelling (10). The device (27) includes a plurality of valves, which may include three valves (12, 13, 14). The valves (12, 13) are connected to an outlet conduit (16) by means of a flow restriction device (15). The valves (12, 13, 14) are electronically operated and are controlled by a programmable logic controller (PLC) (17).

14 Claims, 4 Drawing Sheets

(56) References Cited

U.S. PATENT DOCUMENTS

| | | | |
|---|---|---|---|
| 4,313,465 A * | 2/1982 | Holzem et al. | 251/129.05 |
| 4,930,488 A * | 6/1990 | Pearman et al. | 137/624.11 |
| 6,691,724 B2 * | 2/2004 | Ford | 137/624.11 |
| 6,827,288 B2 * | 12/2004 | Noelke | 137/624.11 |
| 7,225,057 B2 * | 5/2007 | Froman et al. | 239/69 |
| 7,613,547 B1 * | 11/2009 | Woytowitz | 239/69 |
| 8,160,750 B2 * | 4/2012 | Weiler | 239/69 |
| 2002/0148515 A1 | 10/2002 | Coffey et al. | |

FOREIGN PATENT DOCUMENTS

| | | |
|---|---|---|
| FR | 2502811 A1 | 10/1982 |
| FR | 2565709 A1 | 12/1985 |
| GB | 2299690 A | 10/1986 |
| JP | S55-34761 A | 3/1980 |
| JP | H01-189707 A | 7/1989 |
| JP | H04-145508 A | 5/1992 |
| JP | H04-148312 A | 5/1992 |

OTHER PUBLICATIONS

International Preliminary Report on Patentability mailed Oct. 14, 2010, from PCT Application No. PCT/AU2009/000402 (9 pages).

European Search Report mailed Oct. 18, 2013, from European Application No. 09727438.5 (8 pages).

* cited by examiner

FLOW CONTROL DEVICE AND FLOW CONTROL METHOD

CROSS REFERENCE TO RELATED APPLICATIONS

This application is a National Stage of International Application No. PCT/AU2009/000402 filed Apr. 1, 2009 and which claims the benefit of Australian Patent Applications No. 2008901562 filed Apr. 1, 2008 and No. 2008904936 filed Sep. 23, 2008, the disclosures of all applications being incorporated herein by reference.

TECHNICAL FIELD

The present invention relates to flow control devices and more particularly to flow control devices that regulate the flow of water from a mains supply to a water use location, such as a domestic or commercial premises.

BACKGROUND OF THE INVENTION

Typically commercial and domestic premises are connected to the mains water supply merely by a meter and an isolation valve (tap). It is also common for outlets (taps) within the premises to be provided with water restriction devices to aid in reducing the volume of water consumed.

The above discussed systems suffer from the disadvantage that should a leak occur, for example in the water network of the premises, it cannot easily be detected. Particularly if the leak is visually not observable, then it may be some considerable time before the leak is detected.

Still further, the above water supply systems suffer from the disadvantage that the supply cannot be remotely controlled nor monitored.

OBJECT OF THE INVENTION

It is the object of the present invention to overcome or substantially ameliorate at least one of the above disadvantages.

SUMMARY OF THE INVENTION

There is disclosed herein a water flow control device including:
 a conduit for connection to a water supply;
 a plurality of valves arranged in parallel and connected to the conduit to receive water therefrom;
 a programmable controller operatively associated with the valves to cause operation thereof between a closed and an open configuration; and
 a water outlet conduit connected to each of the valves to receive water therefrom when the valves are in the open configuration.

Preferably, the device further comprises a pressure sensor downstream of the valves and operatively associated with the controller to provide a signal thereto indicative of water pressure downstream of the valves.

Preferably, the device further comprises a flow meter downstream of the valves and to provide a signal to the controller indicative of flow through the valves.

Preferably, the device further comprises at least one flow restriction operatively associated with a corresponding one of the valves and arranged between the water supply and the outlet conduit.

Preferably, at least one other of the valves couples the water supply to the outlet conduit via an unrestricted coupling.

Preferably, the device further comprises a control program recorded within the controller and executable by the controller to cause the device to detect a demand for water at the outlet supply and to selectively open at least one of the valves for a first predetermined period of time, and subject to detection of a continued demand for water after expiration of the first predetermined period of time, to selectively open at least another of the valves for a second predetermined period of time.

Preferably, the device further comprises a modem device operatively associated with the controller to provide signals thereto to operate the controller.

Preferably, the signals comprise command to modify the predetermined periods of time and to open and close the valves.

Preferably, the device further comprises an interface operatively associated with the controller via which an operator can change operating parameters of the controller.

There is further disclosed herein a method of supplying water from a water supply to an outlet conduit, said method comprising the steps of:
 (a) detecting a demand for water at the outlet conduit;
 (b) opening a first valve coupling the water supply to the outlet conduit via a first restriction for at least a first period of time; and
 (c) at an expiry of the first period, detecting a continued demand for water and opening a second valve coupling to the water supply to the outlet conduit for a second period of time.

Preferably, the method further comprises detecting at least substantial cessation of flow in the outlet conduit and closing the or each valve in response thereto.

Preferably, the second valve is associated with a second flow restriction, said method further comprising:
 (d) at an expiry of the second period, detecting a continued demand for water and opening a third valve affording an unrestricted coupling between the water supply to the outlet conduit.

Preferably, the third valve is opened for a third period of time.

Preferably, step (a) comprises detecting a drop in pressure within the outlet conduit.

Preferably, the detecting of step (c) comprises detecting a flow of water in the outlet conduit.

There is yet further disclosed herein a method of detecting a leak in water system coupled to an outlet conduit; said method comprising the steps of:
 opening a valve coupling a water supply to the outlet conduit to pressurize the system;
 closing the valve;
 at a predetermined period of time after closing the valve, opening the valve and detecting a flow of water in the outlet conduit;
 forming a message representative of leak determination from any detected flow.

Preferably, the message is at least displayed upon a display device operatively associated with the valve.

Preferably, the message is transmitted to a user associated with the system.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
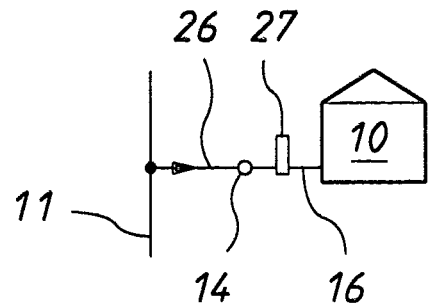
FIG. 1 is a schematic side elevation of a water supply to a premises such as a domestic home.

In the accompanying drawings there is schematically depicted in FIG. 1 is a domestic dwelling 10 connected to a mains water supply 11 by a conduit 26. The conduit 26 delivers water to a flow control device 27. Typically, a meter 14 connects the conduit 26 to the supply 11.

Figure 2:
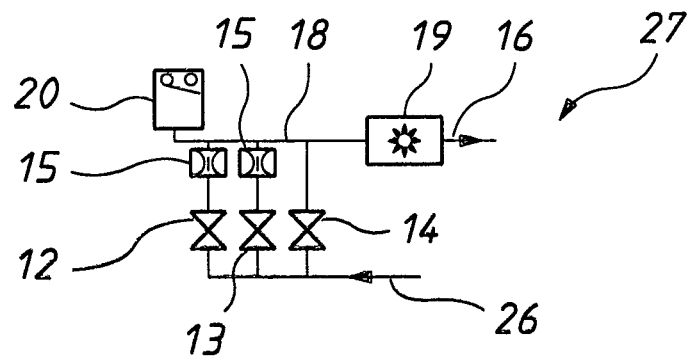
FIG. 2 is a schematic diagram of a water flow control device employed in the supply of FIG. 1.

As seen in FIG. 2, the device 27 includes a plurality of valves, which in this embodiment includes three valves 12, 13, and 14. The valves 12 and 13 are connected to an outlet conduit 16 by means of flow restriction devices 15 which each permit supply of a portion of the nominal maximum flow to the dwelling 10. Desirably each of the restriction devices operate for 25% of nominal flow. This may be achieved by reduced cross-sectional area of connecting conduit between the valves 12 and 13 and the conduit 18. The valve 14 couples to the conduit 18 via a unrestricted coupling (conduit) and hence is able to supply the nominal maximum flow to the dwelling 10.

The valves 12, 13 and 14 are electrically operated and are controlled in operation by a programmable logic controller (PLC) 17. The controller 17 opens and closes the valves 12, 13 and 14 so that water flows from the conduit 26 to the conduit 16. As an alternative to a PLC, a dedicated application specific integrated circuit (ASIC), or other suitable embedded device, may be used.

The valves 12, 13 and 14 are arranged in parallel and are each connected to a conduit 18 that extends to a flow meter 19 connected to the conduit 16. The flow meter 19 provides an electric signal, delivered to the controller 17, that provides an indication of the flow being delivered to the conduit 16.

A pressure sensor 20 is downstream of the valves 12, 13 and 14 and communicates with the conduit 18 to provide a signal indicative of the pressure in the conduit 18. This signal from the sensor 20 is delivered to the controller 17. The sensor can be a pressure switch (as illustrated) but is desirably a pressure transducer configured to provide a variable signal to the PLC 17 indicative of the pressure in the outlet conduit 16.

Figure 3:
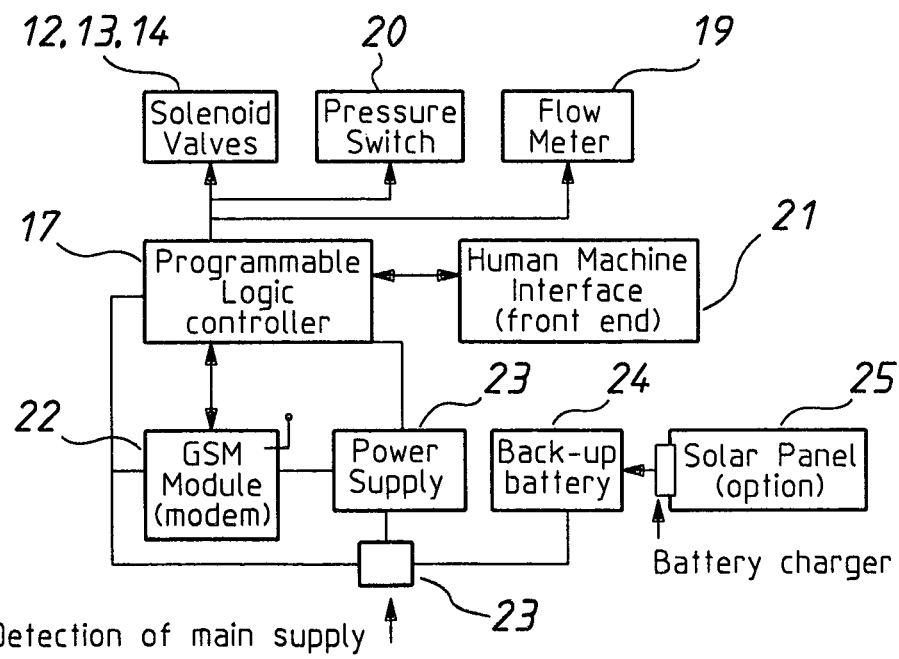
FIG. 3 is a schematic electrical diagram showing items employed in the control device of FIG. 2.

As seen in FIG. 3, preferably, there is associated with the controller 17 an interface 21 that can be used by an operator to configure the controller and operate the controller 17.

It is further preferred that the controller 17 is operatively associated with a GSM module 22 that provides for remote operation of the controller 17. The module 22 may operate according to and with a GSM cellular telephone network. Alternatively, the modem 22 may be configured to operate with other radio frequency cellular telephone networks such as 3G or CDMA. Further, a dedicated radio frequency communication modem may be configured for proprietary operation distinct from a public telephone network, for example facilitating exclusive use by a water supply authority. Alternatively, the modem 22 may be configured for communication via a wired connection to a public switched telephone network may be used as appropriate. In such a configuration, use of SMS as avail in a cellular environment may be substituted by facsimile or Internet Protocol modes of communication.

The modem 22, controller 17, interface 21, valves 12, 13, and 14, switch 20 and flow meter 19 can receive power from any one or more of a number of power supplies including a mains power supply 23, a battery back-up 24 or a solar panel 25.

In operation of the above described device 30, when there is no water demand generated by the dwelling 10, the valves 12, 13 and 14 are closed. However pressure exists in the conduit 18 which is sensed by the sensor 20. If there is a leak downstream of the valves 12, 13 and 14, a drop in pressure in the conduit 18 can be detected by the sensor 20. This information can then be displayed by the controller 17 through the interface 21 so that the leaks can be addressed.

When all water outlets of the dwelling 10 have been closed for a set period of time, a simple leak test may also be performed. After this set period of time at least one or more of the valves 12, 13 or 14 is opened. If there is a leak then water will flow through the flow meter 19 thereby indicating a leak. This operation can be performed via the interface 21 and/or via the modem 22.

When demand in the dwelling 10 is generated, the pressure switch 20 detects a pressure drop in the conduit 18 and conveys this to the controller 17. The controller 17 opens a selected one or more of the valves 12, 13 or 14 so that water flows to the conduit 16. The flow rate can also be monitored. The sequence and number of valves 12, 13 and 14 opened can be tailored to suit the demand of the dwelling 10. For example, when demand is initiated, as an example perhaps valve 12 and/or valve 13 is opened to provide a minimal flow. If demand continues and/or increases then the valve 14 would be opened.

Still further to the above, flow to the dwelling 10 can be controlled remotely by the module 22. For example, if the dwelling 10 has a quota in respect of water supply, if that quota is exceeded then supply can be blocked or reduced via operation of the valves 12, 13 and 14. Still further the GSM module could be used to transmit data regarding water use of the dwelling 10 to a central authority for billing and/or control purposes.

Figure 4:
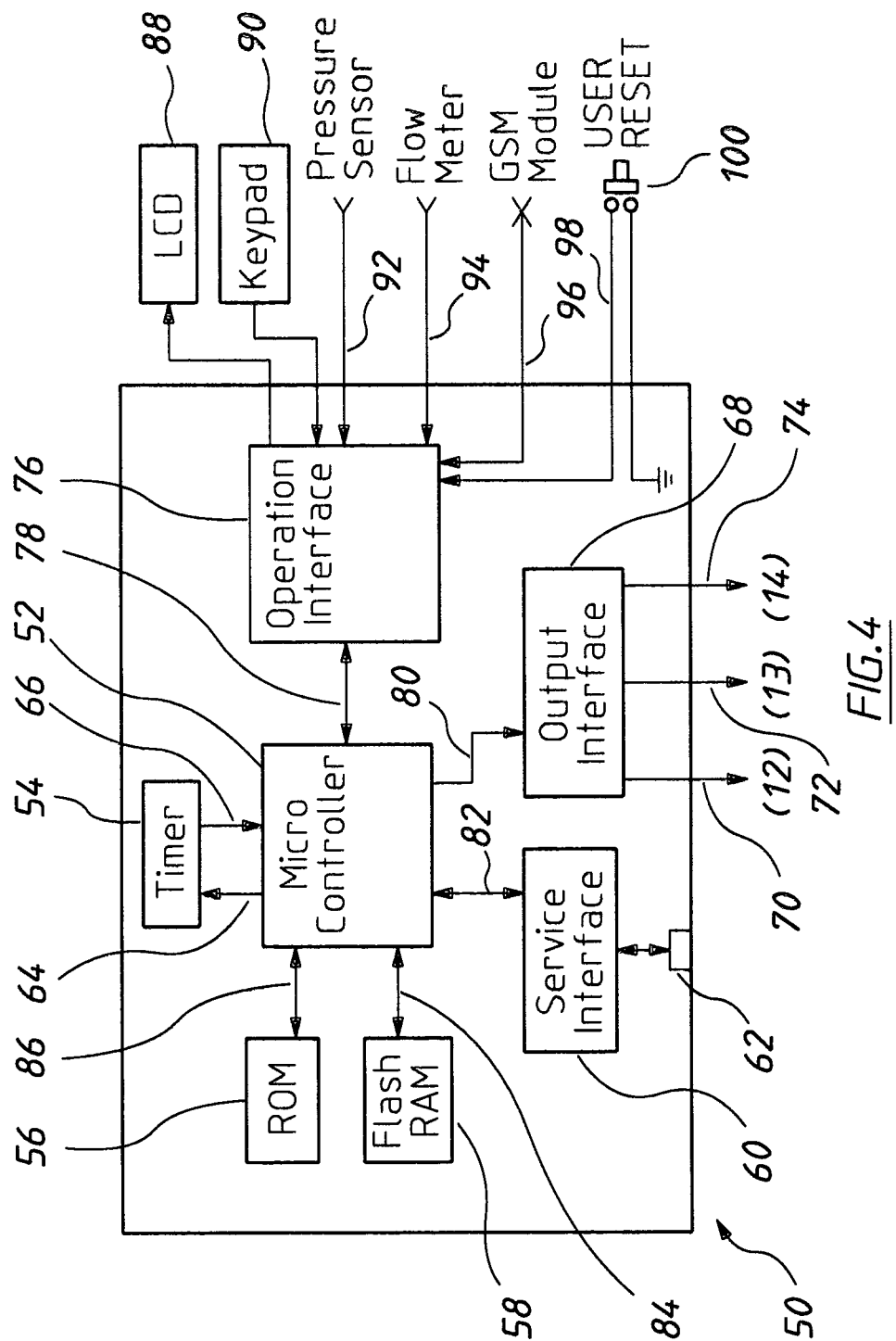
FIG. 4 is a schematic block diagram representation of a specific implementation of the PLC and associated components.

FIG. 4 shows a preferred form of a programmable logic controller (PLC) 50 that may be used in the arrangements of FIGS. 1 to 3. The PLC 50 includes a micro-controller 52 to which is coupled a timer 54 via a write connection 64 and a read connection 66. This permits the micro-controller to load a timer value via the connection 64 to the timer 54, and to detect an expiration of that time via the connection 66. A read only memory (ROM) 56 is provided to supply to the micro-controller 52 via a connection 86 with basic programming commands permitting configuration and start up of the PLC 50. A flash random access memory (RAM) 58 shown coupled to the micro-controller 52 via a bidirectional bus 84. The flash RAM is used to store an operational program by which the water flow device 27 is configured to operate for the control of water flow to the service destination, such as the domestic home 10 of FIG. 1, or commercial premises for example. It is observed in this regard that the commercial premises could be, for example, a single room or suite in a hotel or a supply to a single floor of an office building.

The micro-controller 52 couples to a service interface 60 via a bidirectional connection 82. The service interface 60 further connects to an interface coupling 62 by which service programming and monitoring can be performed. Such programming may be for upgrade of the operational program code stored in the flash RAM 58 or alternatively for reading flow meter volume values obtained over a period of time which are determined by the micro-controller 52 and stored in the flash RAM 58, thus obviating the need for, or providing a backup for, the traditional water flow meter 14 shown in FIG. 1.

The micro-controller 52 also couples via a connection 80 to an output interface 60 which drives each of the valves 12, 13 and 14 via respective output lines 70, 72 and 74. In this regard, each of the valves 12 to 14 are typically solenoid actuated and are usually arranged in a normally-closed configuration such that the provision of electrical power from the interface 60 to the respective solenoid via the connections 72-74 provides for an opening of the corresponding valve 12-14.

The micro-controller 52 further couples to an operation interface 76 via a bidirectional coupling 78. The operation interface 76 permits coupling to a liquid crystal display 88 and a keypad 90, which collectively form the human machine interface 21 seen in FIG. 3. The operation interface 76 further provides for receipt of signals 92 and 94 from each of the pressure sensor 20 and the flow meter 19, as well as a bidirectional communication coupling 96 to the GSM module 22. Further illustrated in FIG. 4 and coupling to the operation interface 76 is a manually operable user reset switch 100 coupled via a connection 98. The user reset switch 100 is typically depressed or otherwise actuated, as will be described, to reset the operational program of the PLC 50, particularly in circumstances where a leak has disabled supply of water flow.

Figure 5:
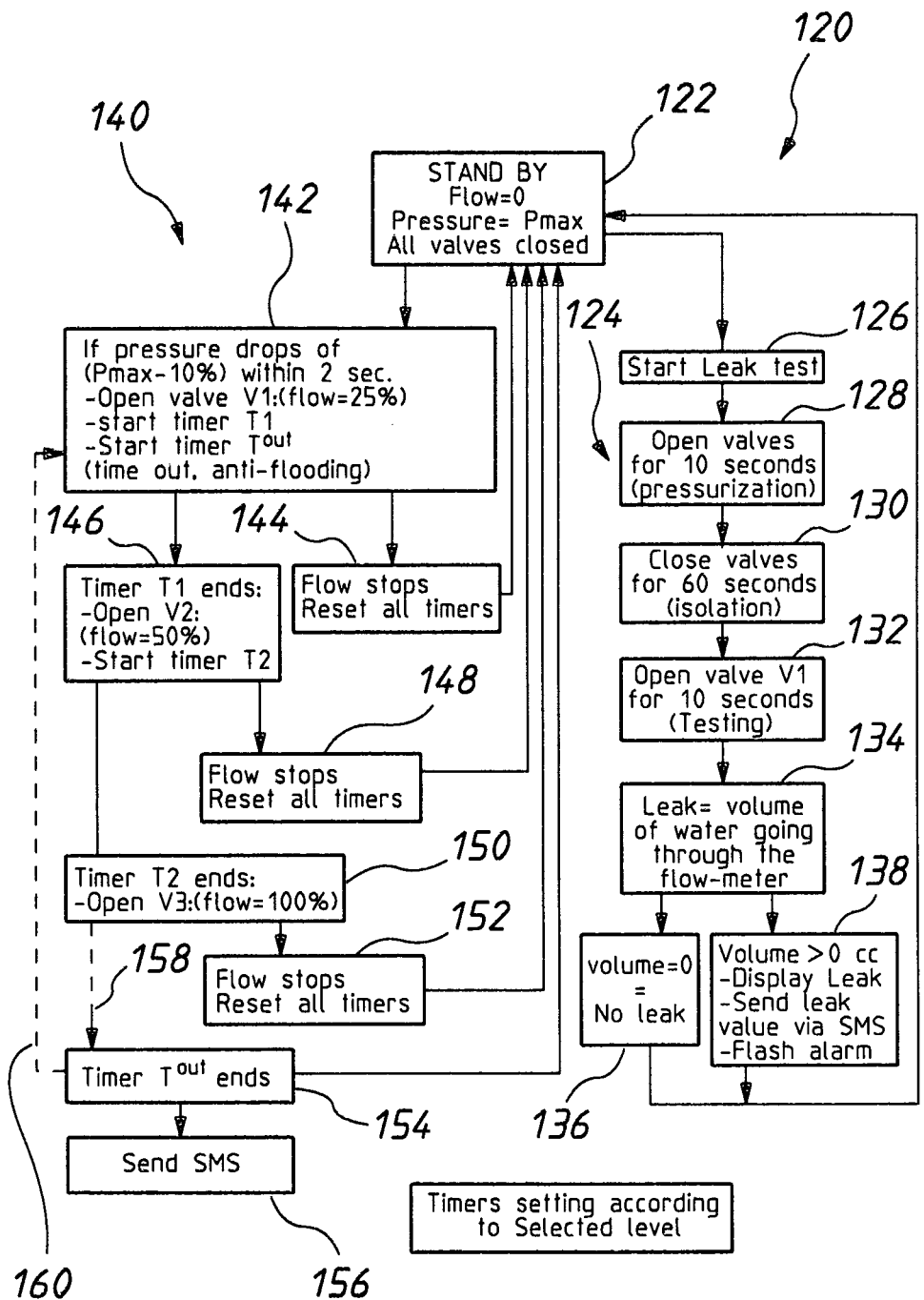
FIG. 5 is a flow chart of a program configured for controlling operation of the water flow control device.

FIG. 5 shows a flowchart of a operational program 120 which is typically encoded and stored in the flash RAM 58 and which is controlled and executed by the micro-controller 52 to cause operation of the PLC 50 and in turn, the water control device 27. The program 120 has an initial step 122 representing flow control in a "stand-by" mode where there is no demand placed upon the water flow and thus the flow is zero and the pressure detected by the pressure sensor 20 is a maximum value corresponding to that in the supply mains 11. In this mode, each of the valves 12, 13 and 14 are closed. The method of operation afforded by the program 120 incorporates two parts. A first part 124 represents operation upon the placing of a demand on the water flow control device 27, and a second part 140 which represents a leak test.

The first part of the program 120 is the normal supply method 140. In this regard, the pressure transducer 20 is configured to monitor the pressure of water in the downstream conduit 18 at least about once every 5 seconds. Where the monitored pressure drops, for example by 10% within any one measuring period, step 142 determines that a demand has been placed on the downstream water supply system and the device 27 is then configured to supply water in response. In this circumstance, according to step 142, the valve V1 12 is opened providing for a flow of 25% to the house. The micro-controller 52 then loads the timer 54 with a timer value T1 (e.g. 30 seconds), and also starts the timer monitoring for a time out (anti-flooding) period $T^{out}$ of, for example, 15 minutes (for example the length of time it takes to ordinarily fill a bath). The flow meter 19 monitors the flow in the downstream water circuit. At step 144, if the flow stops, within the period established by the time period T1, as detected by the micro-controller 52 via the interface 76 and connection 94, all the timers are reset and control returns to step 122 where all valves are closed. An alternative to monitoring the time T1, is to monitor the quantity of flow, for example to a first predetermined volume of 3 liters.

Alternatively, where the time period T1 ends or the predetermined volume has been delivered, at step 146 valve V2 13 is also opened. The valve 13 is associated with the other flow restriction device 15 which corresponds to that associated with the valve 12, in this case 25%. As a consequence, the flow provided by each of valves V1 and V2 that are both open corresponds to a nominal flow rate of 50% and a time value T2 is loaded to the timer 54. The time value T2 may for example be a period of 60 seconds. Alternatively, a flow to a second predetermined volume, of 10 liters for example, may be monitored. Where the flow meter 19 detects a cessation of flow at step 148, all the timers are reset as in step 144 and control returns to step 122 where all valves are again closed.

Where the time period T2 ends as determined by the timer 54 or the second predetermined volume is reached, step 150 then opens valve V3 thus providing for unimpeded and maximum flow of 100% to the downstream load. As long as water demand is active, the PLC 50 records, for example at one minute intervals, the value of flow measured by the flow meter 19. The flow measured may be permanently recorded in the flash RAM 58. Again, as detected at step 152, when the flow stops, the PLC 50 compares the latest value of flow volume measured with that recorded in the flash memory 58. Where the two values are identical, this confirms that the flow has ceased and all timers are reset and all valves are closed according to step 122. This confirmatory approach is desired as the flow meter 19 is desirably implemented using paddle wheel type device which outputs pulses indicative of rotation of the paddle wheel caused by flow. The confirmatory approach ensures that the flow has stopped completely. Another approach may be to close the valve even if a very small flow (lower than the sensitivity of the flow meter 19) is required by the user.

If the maximum flow, as commenced at step 150, continues, the time period established by the anti-flooding timeout $T^{out}$ and started at step 142 is then monitored at step 154. In that circumstance, when the period $T^{out}$ ceases, as determined by the timer 54, all valves are closed at the standby step 122 and desirably, an SMS message is sent at step 156 to the user indicating what could have been determined as a continuous leak or an erroneous use of the system. Such a situation may be indicative of a bath tap being left accidently open, or a burst pipe such as on a washing machine or dish washer, or toilet leaking badly or flush valve stuck open.

Figure 6A:
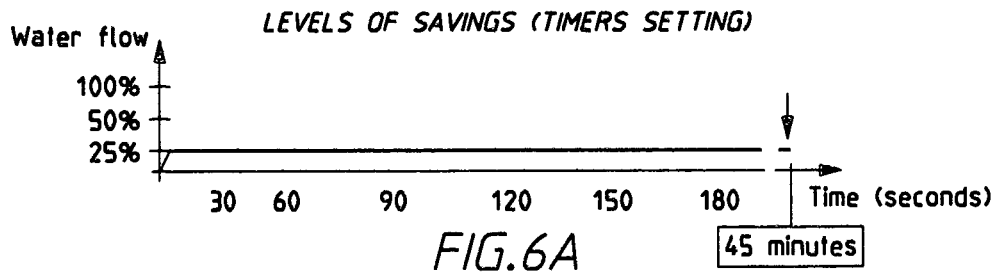
FIGS. 6A to 6F represent timing diagrams for each of six modes of operation of the water flow control device.
Figure 6B:
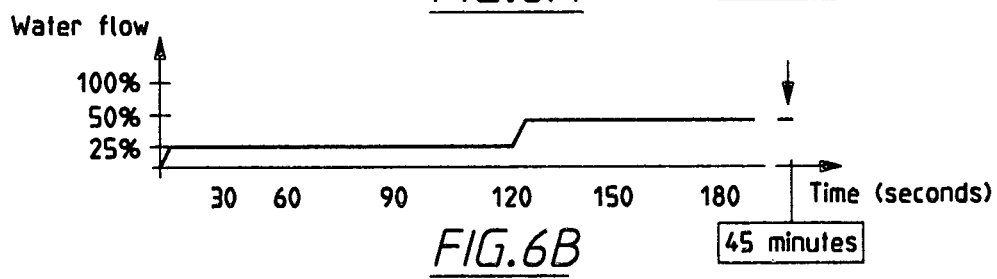
Figure 6C:
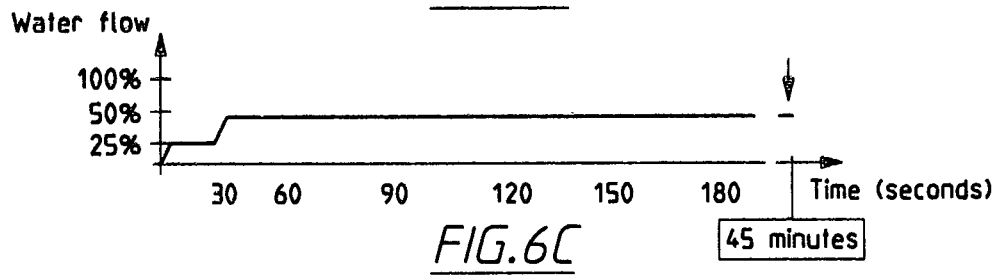

The above described process a schematically depicted in FIG. 6C indicating the sequential increase of supply as demand for water continues over time.

In some implementations, as indicated by the connection 160 in FIG. 5, the operation of the timeout $T^{out}$ may be configured to reset the method 140 to provide for flow at 25%. This may be necessary or desirable in some instances where a continuous use of water is required.

Figure 6D:
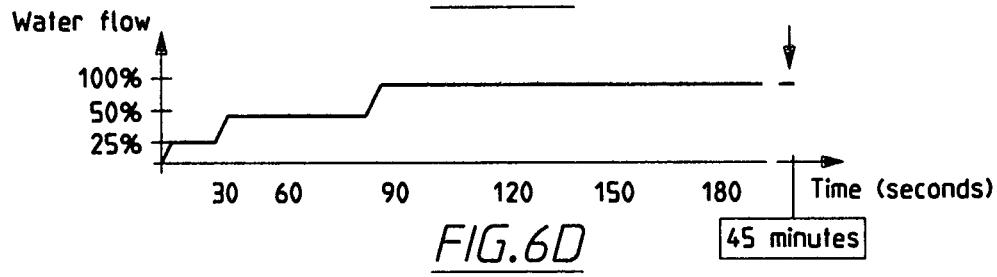
Figure 6E:
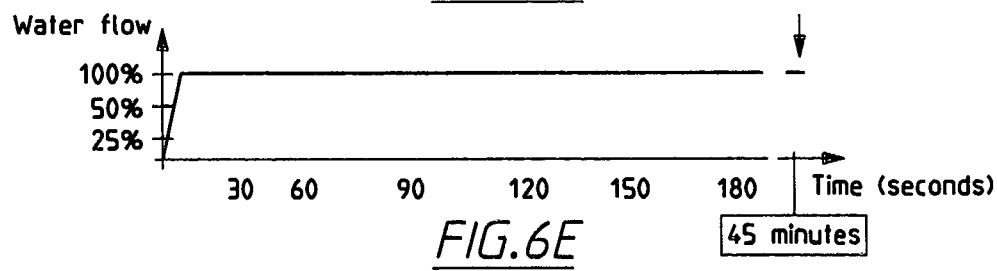
Figure 6F:
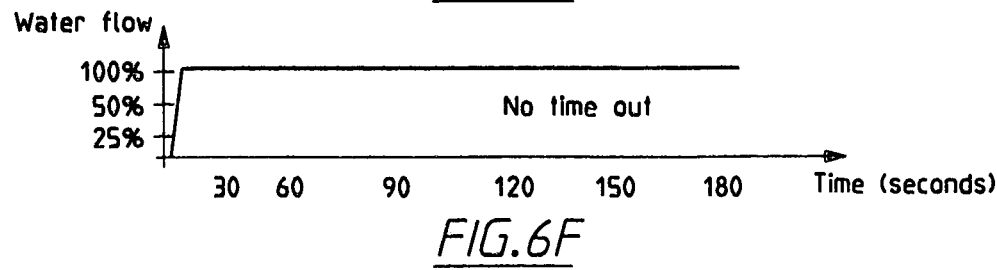

FIGS. 6A, 6B and 6D to 6F showed various other modes of operation of the PLC 17 and are generally indicative of the savings that may be obtained using the supply methods disclosed herein. In FIG. 6A, it is seen that the water flow rate of 25% can be maintained. This mode of operation may be enabled by a supply authority when a user's allocation of water (for example over a day, week or month) has exceeded a predetermined volume. FIGS. 6B and 6D illustrate how the various time periods T1, T2 and $T^{out}$ can be adjusted to vary the water flow provided to the load. As seen in FIG. 6F, at time periods may be disabled to provide continuous flow of water under certain circumstances, for example whilst filling a swimming pool. It will be appreciated that FIGS. 6A-6F represent various programmable modes of operation respectively permitting various different modes of water control that may achieve a range of water use savings.

With respect to the leak test 124, this is started at step 126 periodically in periods of no flow or demand. The leak test, for example may be performed at a time interval of, for example, one hour after the last operation of the method 140 and every hour thereafter. In step 128, the valves 12-13 are opened together for a period of 10 seconds in order to pressurize the downstream portion of the water circuit represented by the domestic house 10 in FIG. 1. At step 130, the valves are closed for a period of sixty seconds thereby to confirm isolation of the downstream load. At step 132, valve V1 12 is then opened for a period of 10 seconds to test a leak. In this configuration, the valve V1 12 is associated with a flow restriction device 15 operable to provide 25% of maximum available (nominal) flow. In this regard, the maximum available flow will be determined by the pressure in the conduit 18 and the cross-section area of the conduit 18. At step 134, the PLC 50 detects any flow value received from the flow identified by the flow meter 19 via the connection 94. If the flow value or detected volume detected is zero, as seen at step 136, no leak is identified and the leak test 124 then concludes returning control back to the standby step 122. Where the flow detected in step 134 is greater than zero, a leak is deemed to have been detected and this result can be displayed on the LCD 88 together with the flashing of a visual alarm or the sounding of a corresponding alarm (not illustrated). An actual value of the leak can also be recorded and sent as an SMS text message via the GSM cellular mobile module. This can be configured to operate to send messages to the occupant of the residence 10 or alternatively or additionally to a water supply authority.

Where the leak is minor, the leak test 124 effectively recharges the downstream is part of the water circuit thus ensuring that water is available therein on demand. Where however the leak is substantial the leak test results in all valves of the circuit being closed and thus only a small amount of water, being that associated with the test (25% nominal flow for 10 seconds), is lost during the performance of each test. If the leak is substantial, such that more water is lost than the volume replenished by the leak test 124, then the valves 12-14 will remain continuously shut off, such that the placing of a normal demand on the system (e.g. by a user turning on a tap) would not cause the opening of any of the valves 12-14. To obviate this problem, the user may depress the reset switch 100 thus resetting the micro-controller 52 to provide for the operation of the PLC 17 according to the method 140 to permit the supply of water.

Using the arrangements disclosed herein and the values detected from the flow meter, volumetric flows can be determined and retained within the flash RAM 58 by operation of the micro-controller 52. This can therefore provide a digitally readable version of volumetric flows which may be detected via the service interface 60, 62 and also which may be transmitted to the user or regulatory authority via the GSM radio module 22 via the connection 96. The GSM module 96 also provides a means by which the user may provide control commands for the PLC 50 by varying the timer values T1, T2, T3 and $T^{out}$. Where those values are not desired, default values determined by the program as loaded via the service interface are used. Alternatively, a user may set, via and SMS message received by the GSM modem 22, specific flow rates (e.g. 25%, 50%, or 100%) according to the operation of the valves 12-14 for desired purposes.

The arrangements described herein provide for the supply of water to domestic and commercial installation that is able to satisfy standard ordinary day-to-day demands. For example, by the sequential increasing of the delivery of water as seen in FIG. 6D and using the time periods T1 and T2, the overall load can be stepped over time, thus assisting in the reduction of "water hammer" which can affect some systems. Further, where demand is low and for a short period of time, only a nominal flow rate of 25% is delivered. This for example may be sufficient to enable an individual user to either wash their hands or fill a glass with water. For more significant uses, an increase flow rate of 50% can be obtained for example to fill a saucepan or a basin. For heavier demands, such as having a shower or whilst the washing machine is operating, the higher flow rates of 100% can be obtained after periods T1 and T2. By providing for leak detection and anti-flooding timeouts, various safety nets are incorporated that aid in reducing water loss.

The arrangement also provide for monitoring supply of water over periods of time and permit, for example control of usage, on a daily basis for example. In this regard, where a daily volume is set for a user location, once that set value is exceed, flow can then be shut off by closing the valves 12-14 or by limiting flow to a predetermined rate, such as by enabling only valve 12 when demand is made. Emergency shut down may be instigated by a supply authority during periods of fire when the fire brigade may require maximum mains pressure for fire fighting purposes. This may be also used if the mains supply were to be contaminated.

The forgoing describes only a number of embodiments of the present invention and modifications can be made thereto without departing from the spirit and scope of the present disclosure.

For example, whilst the valves and flow restriction devices are shown and described as independent connected components, such may be unitarily or integrally formed.

Further, whilst the preferred method of control described above detects a cessation of water flow before the expiry of the various timer periods and responds by closing the valves, the system may be alternatively operated to keep the valves open until such time as the timer period expires. In such circumstances water flow will nevertheless cease or substantially cease (in the presence of minor leaks) yet water will be immediately available at the previous flow if demanded again within the timer period.

The invention claimed is:

1. A water flow control device including:
   a conduit for connection to a water supply;
   a plurality of valves arranged in parallel and connected to the conduit to receive water therefrom;
   a programmable controller operatively associated with the valves to cause operation thereof between a closed and an open configuration;
   a water outlet conduit connected to each of the valves so that said conduit receives water from each of the valves when the valves are in the open configuration; and,
   a pressure sensor downstream of the valves and operatively associated with the controller to provide a signal thereto indicative of water pressure downstream of the valves.

2. A device according to claim 1 further comprising a control program recorded within the controller and executable by the controller to cause the device to detect a demand for water at the outlet supply and to selectively open at least one of the valves for a first predetermined period of time, and subject to detection of a continued demand for water after expiration of the first predetermined period of time, to selectively open at least another of the valves for a second predetermined period of time.

3. A device according to claim 1 further including a modem device operatively associated with the controller to provide signals thereto to operate the controller.

4. A device according to claim 2 further including a modem device operatively associated with the controller to provide signals thereto to operate the controller, wherein the signals comprise command to modify the predetermined periods of time and to open and close the valves.

5. A device according to claim 1 further comprising an interface operatively associated with the controller via which an operator can change operating parameters of the controller.

6. A water flow control device including:
a conduit for connection to a water supply;
a plurality of valves arranged in parallel and connected to the conduit to receive water therefrom;
a programmable controller operatively associated with the valves to cause operation thereof between a closed and an open configuration;
a water outlet conduit connected to each of the valves so that said conduit receives water from each of the valves when the valves are in the open configuration;
at least one flow restriction operatively associated with a corresponding one of the valves and arranged between the water supply and the outlet conduit; and
wherein at least one other of the valves couples the water supply to the outlet conduit via an unrestricted coupling.

7. A device according to claim 6, further comprising a flow meter downstream of the valves and to provide a signal to the controller indicative of flow through the valves.

8. A device according to claim 1, further comprising at least one flow restriction operatively associated with a corresponding one of the valves and arranged between the water supply and the outlet conduit.

9. A device according to claim 8, wherein at least one other of the valves couples the water supply to the outlet conduit via an unrestricted coupling.

10. A device according to claim 6, further comprising a control program recorded within the controller and executable by the controller to cause the device to detect a demand for water at the outlet supply and to selectively open at least one of the valves for a first predetermined period of time, and subject to detection of a continued demand for water after expiration of the first predetermined period of time, to selectively open at least another of the valves for a second predetermined period of time.

11. A device according to claim 6, further including a modem device operatively associated with the controller to provide signals thereto to operate the controller.

12. A device according to claim 11, further comprising a control program recorded within the controller and executable by the controller to cause the device to detect a demand for water at the outlet supply and to selectively open at least one of the valves for a first predetermined period of time, and subject to detection of a continued demand for water after expiration of the first predetermined period of time, to selectively open at least another of the valves for a second predetermined period of time and wherein the signals comprise command to modify the predetermined periods of time and to open and close the valves.

13. A device according to claim 6, further comprising an interface operatively associated with the controller via which an operator can change operating parameters of the controller.

14. A water flow control device including:
a conduit for connection to a water supply;
a plurality of valves arranged in parallel and connected to the conduit to receive water therefrom;
a programmable controller operatively associated with the valves to cause operation thereof between a closed and an open configuration;
a water outlet conduit connected to each of the valves so that said conduit receives water from each of the valves when the valves are in the open configuration
a pressure sensor downstream of the valves and operatively associated with the controller to provide a signal thereto indicative of water pressure downstream of the valves;
a flow meter downstream of the valves and to provide a signal to the controller indicative of flow through the valves;
a control program recorded within the controller and executable by the controller to cause the device to detect a demand for water at the outlet supply and to selectively open at least one of the valves for a first predetermined period of time, and subject to detection of a continued demand for water after expiration of the first predetermined period of time, to selectively open at least another of the valves for a second predetermined period of time;
an interface operatively associated with the controller via which an operator can change operating parameters of the controller; and,
a modem device operatively associated with the controller to provide signals thereto to operate the controller wherein the signals comprise command to modify the predetermined periods of time and to open and close the valves.

* * * * *